UNITED STATES PATENT OFFICE.

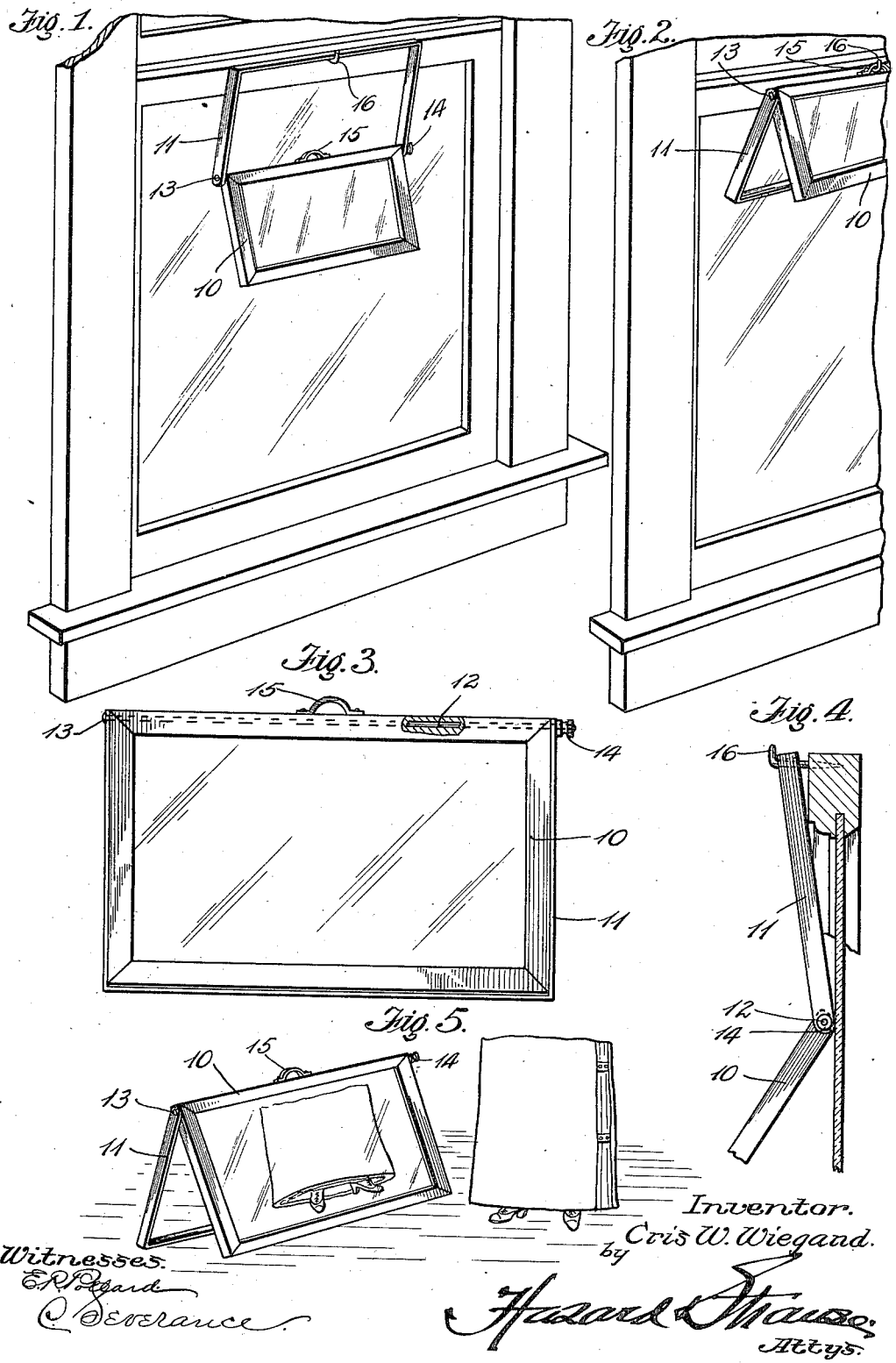

CRIS W. WIEGAND, OF LOS ANGELES, CALIFORNIA.

MIRROR.

1,092,965. Specification of Letters Patent. Patented Apr. 14, 1914.

Application filed April 1, 1912. Serial No. 687,565.

*To all whom it may concern:*

Be it known that I, CRIS W. WIEGAND, a citizen of the United States, residing at Los Angeles, in the county of Los Angeles and State of California, have invented new and useful Improvements in Mirrors, of which the following is a specification.

This invention relates to improvements in adjustable mirrors and it is an object of the invention to provide a mirror with a standard for holding the same in various angles, the said standard being adapted to fold upon the edges of the mirror when not in use.

It is a further object of the invention to provide a mirror with a looped standard having clamping means for holding the same at different angles with respect to the mirror, whereby the mirror may be suspended or otherwise supported at any desired angle.

In the accompanying drawing forming a part of this specification, Figure 1 is a perspective view of the improved mirror shown, suspended upon a window sash by means of the standard thereof. Fig. 2 is a similar perspective view showing the mirror and its standard folded in a different manner, the standard being arranged to prop the mirror at a suitable angle with respect to its support. Fig. 3 is a side elevation of the mirror showing its standard folded upon the edges thereof. Fig. 4 is a vertical sectional view through a window sash with the mirror supported thereon in the manner shown in Fig. 1. Fig. 5 is a perspective view of the mirror placed upon the floor for use as when examining the skirt of a dress or the like.

The details and features of the invention will now be more particularly described, reference being had to the said drawing in which—

10 indicates a mirror having the usual glass mounted in a frame of proper proportions. Pivoted to the said frame is a standard 11 formed of a loop having end bars, and a longitudinally extending intermediate connecting piece. The free ends of the end pieces are pivoted to the ends of the mirror, being preferably held thereon by means of a rod 12 which passes longitudinally through the frame, as clearly shown in Fig. 3. One end of the rod is provided with a head 13 while the other end of the rod carries a thumb nut 14, so that the end pieces of the standard may be clamped in various angles with respect to the mirror. The frame 10 is also provided with a handle 15 preferably placed upon the side of a mirror which carries the clamping rod 12.

The structure of the device is simple in character but yet effective for the purposes desired. The standard 11 is nicely fitted upon the frame so that when it is folded flat with respect to the same it practically becomes a part of the frame as shown in Fig. 3 and does not project so as to be noticeable or in the way. The standard also affords an adjustable suspending means for the mirror when it is desired to hold it in elevated positions. Thus the standard may be hung upon a hook 16 placed in the upper or lower sash of a window. If it is placed in the upper rail of a window sash the said standard may be so clamped with respect to the mirror as to hold it in the position shown in Fig. 1 or Fig. 4, the upper edge of the mirror being steadied against the glass of the window. Of course its angle may be varied to suit the circumstances. The mirror may also be hung upon the hook 16 by means of its handle 15, the standard being turned back of the mirror so as to support the mirror at the desired angle as clearly shown in Fig. 2, the standard resting against the glass for this purpose. The mirror may also be set up upon a table or the floor, in which case the standard will be employed in about the position shown in Fig. 5. This makes a very convenient supporting of the mirror for the adjusting of one's dress or the display of shoes, etc.

What I claim is:

1. A mirror provided with an inclosing frame, said frame having an elongated floor engaging edge; a bolt extending longitudinally through the side of the mirror opposite the floor engaging edge; a bail proportioned to embrace three sides of the mirror and to engage its opposite ends pivotally upon opposite ends of the bolt; and a clamping member carried by the bolt adapted to clamp both ends of the bail simultaneously in angularly adjusted position.

2. A mirror provided with an inclosing frame, said frame embodying opposite sides and ends, one of said sides being an elongated floor engaging side; a bolt extending longitudinally through the opposite side of the frame and extending beyond the end sections of the frame; a bail proportioned to embrace three sides of the frame and pivoted at its opposite ends upon the opposite ends of the bolt; and a clamping member carried by the bolt adapted to fix the bail in angularly adjusted position relative to the frame.

In witness that I claim the foregoing I have hereunto subscribed my name this 21st day of March, 1912.

CRIS W. WIEGAND.

Witnesses:
E. STADTMAN,
EARLE R. POLLARD.

Copies of this patent may be obtained for five cents each, by addressing the "Commissioner of Patents, Washington, D. C."